United States Patent [19]

Guido

[11] Patent Number: 4,730,338
[45] Date of Patent: Mar. 8, 1988

[54] COUPLING CONSTRUCTION FOR AN ELECTRIC FURNACE

[75] Inventor: Heinz Guido, Duisburg, Fed. Rep. of Germany

[73] Assignee: MAN Gutehoffnungshütte GmbH, Fed. Rep. of Germany

[21] Appl. No.: 918,398

[22] Filed: Oct. 14, 1986

[30] Foreign Application Priority Data

Oct. 5, 1985 [DE] Fed. Rep. of Germany ....... 3535690

[51] Int. Cl.$^4$ .......................... H05B 7/02; H05B 7/20
[52] U.S. Cl. ........................................ 373/72; 373/108
[58] Field of Search ................................. 373/72, 108

[56] References Cited

U.S. PATENT DOCUMENTS 4,277,638 7/1981 Stenkvist .............................. 373/72

Primary Examiner—Roy N. Envall, Jr.
Attorney, Agent, or Firm—McGlew and Tuttle

[57] ABSTRACT

A DC arc or resistance melting furnace has a current supply line and a coolant supply line located in the furnace heart in the connection is constructed so that a point of separation is provided between an attachment assembly for the current and cooling lines and the vessel. The attachment assembly is formed at the terminal and fastened to the furnace vessel at a contact point. When changing the contact electrodes, it is a simple matter to undo the point of separation of the electrodes from the assembly without removing the coolant lines or the whole assembly may be removed.

9 Claims, 3 Drawing Figures

COUPLING CONSTRUCTION FOR AN ELECTRIC FURNACE

BACKGROUND OF THE INVENTION

Field of the Invention

This invention relates in general to electrical furnaces and in particular to new and useful electrode and coolant line assembly which may be easily connected or disconnected from each other and from the furnace.

The invention relates particularly to a contact electrode arrangement for direct current arc or resistance melting furnaces comprising a support plate, with a base plate disposed at a distance therefrom with contact rods attached thereto as well as current and cooling medium lines also attached thereto.

The design and operation of similar furnaces is known. A contact electrode arrangement is described specifically in DE-PS No. 31 06 741. Further, reference is made to German patent application No. P 35 35 692.8, in which an exchangeable contact electrode assembly is described. This assembly comprises the complete contact electrode and support plate, base plate, contact devices (contact rods) as well as current cables and cooling medium conduits mounted on the base plate. The contact electrode is a tamped refractory material made with a template as a block and, as an exchangeable assembly, is lowered by hoists into an opening in the furnace tank floor, so that the contact electrode rests with its support plate on the edge of the furnace tank floor. The annular gap between the furnace floor lining and the contact electrode is tamped. The current cables and coolant conduits are disposed on attachment elements.

When after a respective operating time the contact rods are used up, instead of changing individual contact rods, according to the patent application the complete contact electrode assembly is detached by means of pressure elements from its seat in the furnace tank floor and lifted and thereafter extracted upwardly from the furnace tank by hoists which are fitted on support means of the contact electrode assembly.

To prepare the contact electrode change, the current cables and coolant conduits must be taken off the attachments of the contact electrode. The drawback of this procedure is that the current cables and also the coolant conduits are difficult to handle due to their weight. If large melting furnace units are involved, even special assembly and disassembly equipment is needed for this work. Besides, the ergonomic conditions in the respective work zone are very unfavorable, as the heat radiation of the melting furnace makes work difficult for the personnel. It is the object of the invention to simplify the attaching of the current cables and coolant conduits at the contact electrode, to accelerate it and to improve it in ergonomic respect.

SUMMARY OF THE INVENTION

According to the invention, the attachment means for the current cables and coolant conduits are in the form of a terminal which has at its top side a contact point for connection with the base plate of the contact electrode. This contact point can be realized by simple means. The union may be a screw, wedge or clamping union. The terminal is attached to the furnace tank with interposition of an insulation.

By the measures according to the invention it is achieved that when changing the contact electrode it now suffices, for separating current cables and coolant conduits from the contact electrode, to separate the contact at the terminal. When removing the contact electrode, the current cables and coolant conduits remain at the terminal secured on the furnace tank.

Accordingly, it is an object of the invention to provide an improved contact and coolant median installation for an electric furnace which comprises an assembly which may be easily connected or disconnected from a bottom support plate of the furnace and which carries the electrical and coolant medium conduits.

A further object of the invention is to provide an electric furnace and a coupling connection therefore which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

GENERAL DESCRIPTION OF THE PREFERRED EMBODIMENTS

Figure 1:
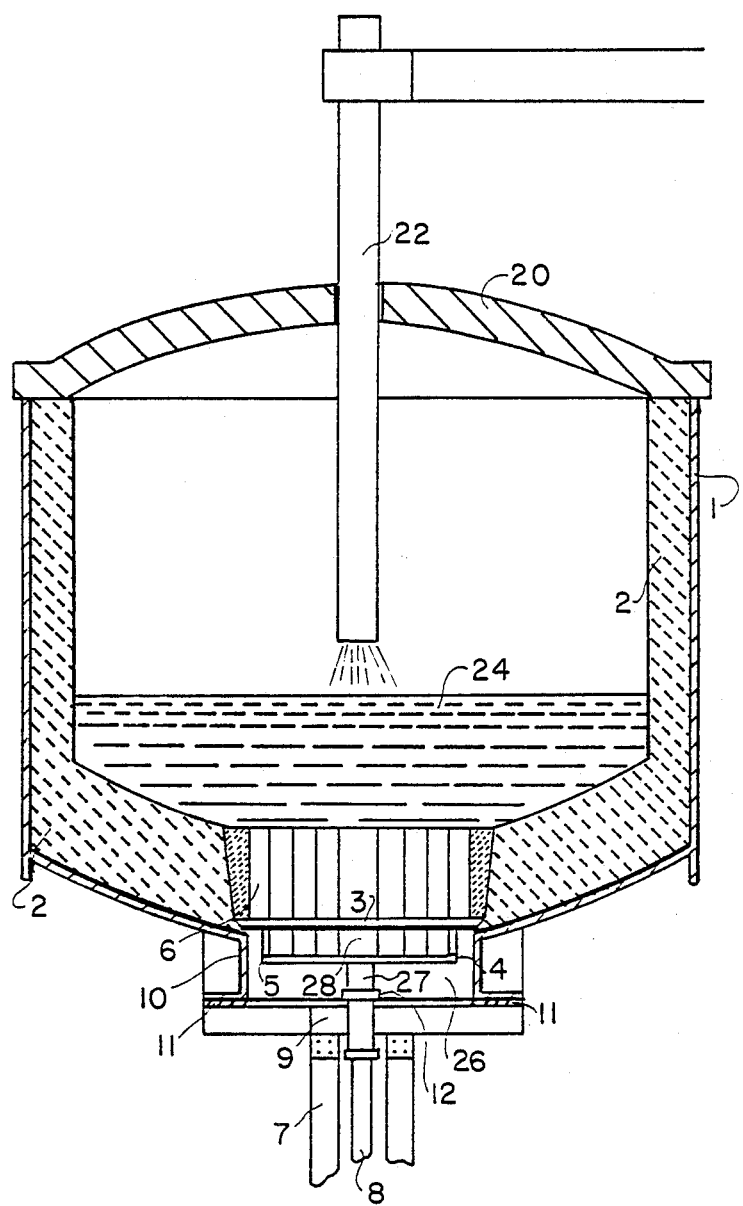
FIG. 1 is a arial sectional view through an arc furnace tank having a contact electrode arrangement in the operating state, in accordance with the corrections.

Referring to the drawings in particular the invention embodied therein comprises an electrical furance which may be either a direct current or an arc furnace that includes a vessel (1) with an outer steel shell and an inner lining of refractory (2). The vessel (1) has a cover (20) with a electrode (22) extending therethrough and positioned over a liquid metal (24). In accordance with the invention, the bottom of the vessel (1) has an opening (26) in which is positioned a support plate (3). A base plate (4) is connected to the bottom electrical assembly having a support plate (3) at its base location therefrom and is provided with a extension (27) which is connected in accordance with the invention to a coupling assembly (12). A terminal assembly or terminal (9) detachably secured current cables (7) and coolant cable (8) to the vessel.

The furnace shell of a direct current arc furnace illustrated in the figures has a steel jacket and a vessel steel shell bottom (1). The interior of the furnace shell jacket (1) is provided with a refractory lining (2). Below the furnace hearth, i.e. in the area of the furnace bottom above an opening (26) thereof, a base plate (4) is provided an interstice (28) being formed or left between base plate (4) and support plate (3). The interstice (28) is traversed by coolants, e.g. air. At the base plate (4) several contact rods (5) are attached, which are cooled in the region of the interstice and are embedded by their remaining part in the refractory tamping (6) and extend up the melt. The contact rods (5) are of metal, preferably of a material similar to the material being melted.

The bottom of the furnace tank (1) has an edge reinforcement (10). The current cables (7) and coolant conduits (8) are attached by an attachment means on the terminal (9), which in turn is attached to the edge reinforcement (10) of the tank bottom. At the attachment points of terminal (9) at the edge reinforcement (10), an insulation (11) is disposed, also the terminal is insulated, of course. The contact connection (point of separation) (12) between the terminal (9) and the base plate (4) is established so that rapid detachability is ensured. This may be done by screwing, wedging or clamping.

Figure 2:
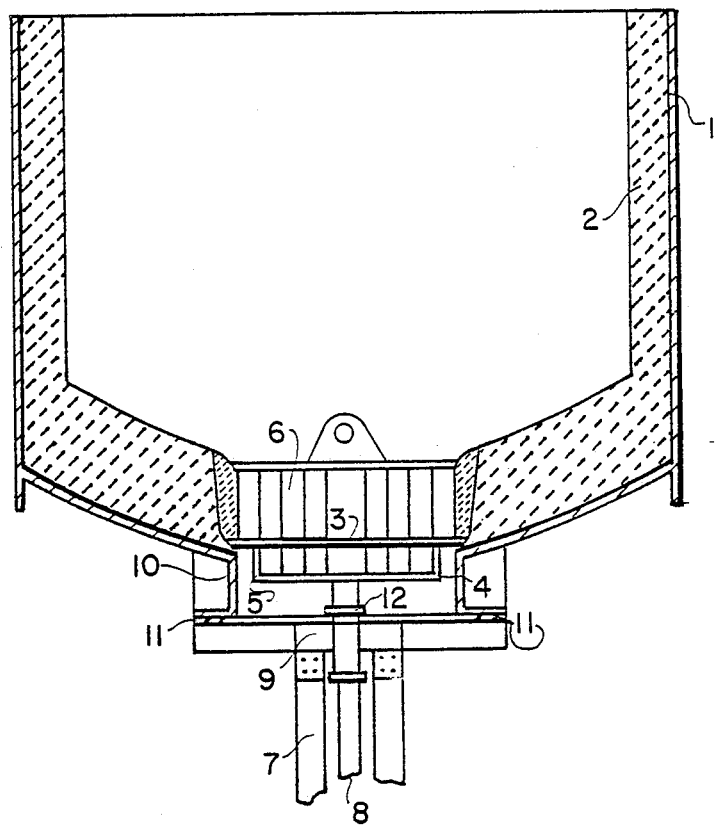
FIG. 2 is a sectional view similar to FIG. 1 but with the furnace cover pivoted out and before change of the contact electrode.
Figure 3:
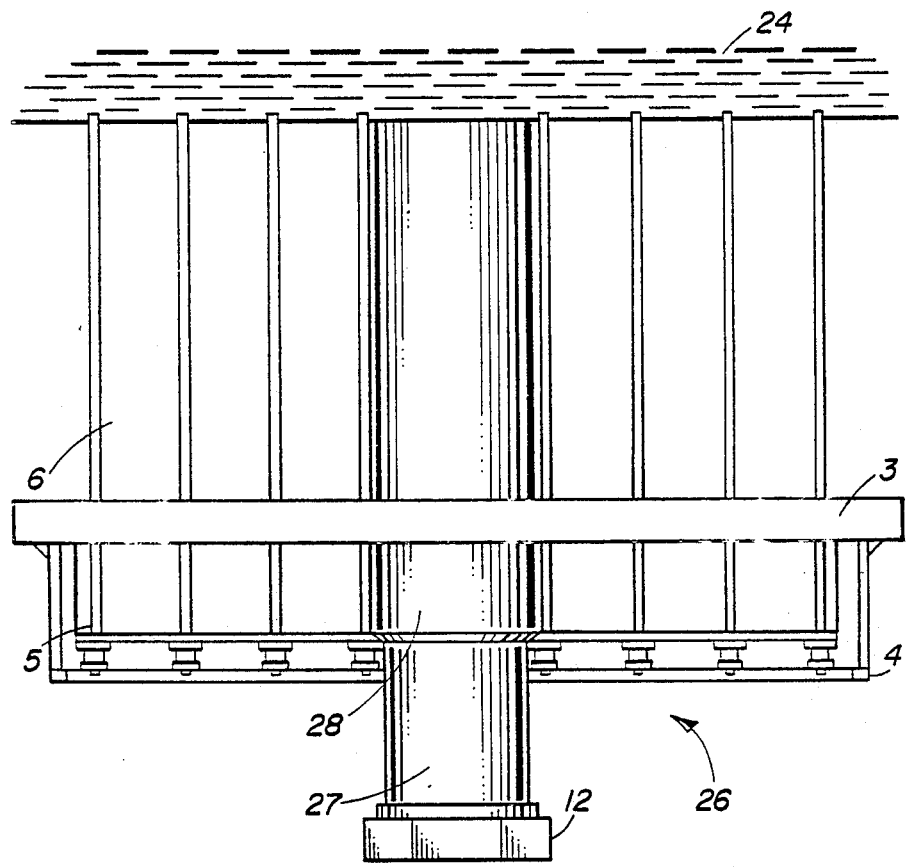
FIG. 3 is an enlarged view of the contact electrode.

FIG. 2 shows the furnace tank with pivoted-out furnace cover (not shown) before the contact electrode is changed. Accordingly the contact rods 5 are burned down. Inserted in the residual melt is holder means in the form of a carrying lug, by which the contact electrode is extracted upwardly. Before changing the contact electrode, the current and coolant line connections are detached at the separating point (12) or coupling assembly of the terminal (9) toward the contact electrode, while the lines (7) and (8) remain at the terminal (9), which in turn is secured on the furnace tank.

While a specific embodiment of the invention has been shown and described in detail to illustrate the application of the principles of the invention, it will be understood that the invention may be embodied otherwise without departing from such principles.

What is claimed is:

1. A contact electrode arrangement for a direct current melting furnace having a vessel with a bottom opening, comprising a support plate positioned within the opening, a base plate connected to said support plate and positioned at a base location therefrom, a terminal assembly connected to said base plate and having attachment means thereon, a plurality of electrical and coolant cables connected to said attachment means of said terminal, said terminal having an electrical connection to said base plate and a passage for the cooling medium.

2. A contact electrode arrangement according to claim 1, wherein there is a separation point between said base plate and said terminal assembly and including means for detachably releasing said terminal assembly from said base plate.

3. A contact electrode arrangement according to claim 1 wherein including means carried by said assembly for easily securing said assembly to said base plate.

4. Contact electrode arrangement according to claim 1 wherein at the connection between said terminal assembly and said base plate there is insulation.

5. A contact electrode arrangement for a direct current melting furnace comprising: a vessel with a bottom opening; an exchangeable contact electrode assembly positioned within the opening including a support plate, positioned within the opening, a base plate, connected to said support plate and positioned at a base location therefrom, at least one metal contact rod fastened to said base plate, with refractory tamping around said at least one rod, said exchangeable contact electrode assembly being supported by said vessel, within said opening, so as to be removable therefrom in an upward direction, a terminal assembly having attachment means thereon; a plurality of electrical and coolant cables connected to said attachment means of said terminal; and, coupling assembly means for connecting the terminal assembly for providing electrical connection to said base plate and a fluid passage for cooling medium provided by said coolant cable, said coupling assembly means defining a point of separation between said exchangeable contact electrode assembly and said terminal assembly.

6. A contact electrode arrangement according to claim 5, further comprising: a bottom edge reinforcement connected to said vessel adjacent said vessel bottom opening, said terminal assembly being connectable to said bottom edge reinforcement so as to fixedly position said terminal assembly relative to said vessel.

7. A contact electrode arrangement according to claim 5, wherein: a fluid and electrical connection extension is provided between said point of separation defined by said coupling assembly means and said base plate.

8. A contact electrode arrangement according to claim 6 wherein: insulation is disposed between said bottom edge reinforcement and said terminal assembly.

9. A contact electrode arrangement for a direct current melting furnace comprising: a vessel with a bottom opening; an exchangeable contact electrode assembly positioned within the opening, including a support plate positioned within the opening, a base plate connected to said support plate and positioned at a base location therefrom, at least one metal contact rod fastened to said base plate, refractory tamping around said at least one rod, said contact electrode assembly positioned within said opening to as to be removable therefrom in an upward direction; a bottom edge reinforcement attached to said vessel adjacent said bottom opening, a terminal assembly having attachment means thereon, said terminal assembly connected to said bottom edge reinforcement, at least one electrical cable and at least one cooling cable each of which is connectable to said attachment means of said terminal assembly; an electrical connection and fluid passage extension connected to said base plate; and, coupling assembly means for connecting said terminal assembly for providing electrical connection to said base plate and a fluid passage for cooling medium in said at least one coolant cable, said coupling assembly defining a point of separation between said terminal assembly and said extension, connected to said exchangeable contact electrode at said base plate, so that said terminal assembly may be disconnected at the point of separation so said exchangeable contact electrode assembly may be removed from said vessel in an upward direction.

* * * * *